US008631136B2

(12) United States Patent
Tennyson et al.

(10) Patent No.: US 8,631,136 B2
(45) Date of Patent: Jan. 14, 2014

(54) METHODS, SYSTEMS, AND COMPUTER PROGRAMS FOR OPTIMIZING NETWORK PERFORMANCE

(75) Inventors: Gary Tennyson, Pelham, AL (US); Fariborz Behi, Alpharetta, GA (US); Stephen Fitzpatrick, Roswell, GA (US); Trevor Hill, Newnan, GA (US); Amir M. Sheikh, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1968 days.

(21) Appl. No.: 11/553,203

(22) Filed: Oct. 26, 2006

(65) Prior Publication Data

US 2007/0124727 A1    May 31, 2007

Related U.S. Application Data

(60) Provisional application No. 60/730,519, filed on Oct. 26, 2005.

(51) Int. Cl.
*G06F 15/16* (2006.01)
*G06F 15/173* (2006.01)
*G06F 9/44* (2006.01)

(52) U.S. Cl.
USPC .............................. 709/228; 709/223; 703/21

(58) Field of Classification Search
USPC ................... 709/221, 223, 224, 228; 703/21; 370/252
See application file for complete search history.

(56) References Cited

U.S. PATENT DOCUMENTS

| | | | | |
|---|---|---|---|---|
| 6,404,738 B1 * | 6/2002 | Reininger et al. | ............. | 370/236 |
| 6,505,249 B1 * | 1/2003 | Rehkopf | ................... | 709/224 |
| 6,647,413 B1 * | 11/2003 | Walrand et al. | ............... | 709/224 |
| 6,957,169 B1 * | 10/2005 | Van Horne | .................... | 702/182 |
| 7,355,997 B2 * | 4/2008 | Qian et al. | ..................... | 370/328 |
| 7,403,487 B1 * | 7/2008 | Foladare et al. | ............... | 370/252 |
| 7,774,440 B1 * | 8/2010 | Bagrodia et al. | ............... | 709/221 |
| 2004/0141519 A1 * | 7/2004 | Greenfield et al. | ........... | 370/463 |
| 2004/0235490 A1 * | 11/2004 | Lv | ................................. | 455/453 |
| 2005/0053005 A1 * | 3/2005 | Cain et al. | ...................... | 370/235 |
| 2005/0175117 A1 * | 8/2005 | Wu et al. | ........................ | 375/286 |
| 2005/0237940 A1 * | 10/2005 | Tennyson | ....................... | 370/235 |
| 2006/0264178 A1 * | 11/2006 | Noble et al. | ............... | 455/67.11 |

* cited by examiner

*Primary Examiner* — Brian J Gillis
(74) *Attorney, Agent, or Firm* — Cantor Colburn LLP

(57) ABSTRACT

Methods, systems, and computer program products, for optimizing performance of ports in a network are provided. The method includes gathering a set of performance data for a port provisioned with a profile. The profile is defined by parameters with associated metrics that are used to establish a level of service for the port. The method also includes analyzing the set of performance data in light of the parameters in the profile to determine a current performance level of the port and performing a set of actions using the current performance level as a baseline. The set of actions include incrementally adjusting at least one of the parameters, determining another set of performance data in response to the adjusting, evaluating the performance data to determine a new performance level, and determining from the new performance level if a maximum performance level for the port is realized.

20 Claims, 8 Drawing Sheets

| Trigger Type | Red or Green Direction (State Machine) | Track Type | Test Priority |
|---|---|---|---|
| New DSL Service | Green | Initial | Low |
| Change Order for DSL Service | Green | Fast | Medium |
| Conversion Script | Green | Fast | Medium |
| Port Move | Green | Fast | Medium |
| Manual Evaluation Test | Green | Fast | High |
| Manual Profile Change | Green | Fast | High |
| TCA | Red | Red Assessment Track | N/A |
| Backoff Evaluation Test | Green | Slow | Medium |
| Successful Green Assessment | Green | Slow or Fast (unchanged) | N/A |
| Successful Green Assessment at MaxSync1 | Converged | Dormant (note for ports converged in MaxSync1 or MaxSync2 dormant timer is set to infinite) | N/A |
| Successful Red Assessment | Converged | Dormant | N/A |
| Unsuccessful Green Assessment | Red | Red Assessment Track | N/A |
| Unsuccessful Red Assessment | Red | Red Assessment Track | N/A |

*FIG. 6*

METHODS, SYSTEMS, AND COMPUTER PROGRAMS FOR OPTIMIZING NETWORK PERFORMANCE

CROSS REFERENCE TO RELATED APPLICATIONS

This application claims the benefit of U.S. Provisional Application 60/730,519, filed Oct. 26, 2005, the contents of which are incorporated by reference herein in its entirety.

BACKGROUND OF THE INVENTION

The present invention relates generally to the field of telecommunications and, more particularly, to methods, systems, and computer program products for optimizing network performance.

With the advent of newer and faster network services (e.g., digital subscriber line (DSL) services), come various challenges in implementing these services. For example, with higher speed DSL services, communications lines have become more susceptible to transient noise effects, e.g., periodic disturbances from machinery, power lines, nearby appliances, AM radio transmissions, etc. This is due in part to faster transmission of signals over a communications path whereby the signals generate less power while the level of noise remains constant. When signal-to-noise ratios plummet due to transient noise effects, a loss of connection may occur whereby the affected modem needs to re-initiate the communications session with a network modem administered by a service provider. Of course, if the transient noise persists, the loss of connection may continue as well.

Oftentimes, a customer experiencing persistent issues with a connection will seek guidance from a technical support group of the DSL service provider. The technical support group may attempt to resolve the issue by placing the customer's service on a profile that has better noise immunity; that is, the modems initialize with a higher signal-to-noise ratio. However, there is a trade-off in implementing this solution. The higher signal-to-noise ratio typically results in a decrease of the customer's data rate, ultimately slowing down the connection. Moreover, the higher the DSL speed offered, the greater the likelihood that such transient noise effects will impact the customer's overall experience.

What is needed, therefore, is a way to optimize customers' DSL services for a range of different profiles.

BRIEF SUMMARY OF THE INVENTION

Exemplary embodiments relate to a method for providing network performance optimization. The method includes gathering a set of performance data for a port provisioned with a profile. The profile is defined by parameters with associated metrics that are used to establish a level of service for the port. The method also includes analyzing the set of performance data in light of the parameters in the profile to determine a current performance level of the port and performing a set of actions using the current performance level as a baseline. The set of actions include incrementally adjusting at least one of the parameters, determining another set of performance data in response to the adjusting, evaluating the performance data to determine a new performance level, and determining from the new performance level if a maximum performance level for the port is realized.

Exemplary embodiments further relate to a system for providing network performance optimization. The system includes a computer processor. The system also includes an application executing on the computer processor. The application performs a method. The method includes gathering a set of performance data for a port provisioned with a profile. The profile is defined by parameters with associated metrics that are used to establish a level of service for the port. The method also includes analyzing the set of performance data in light of the parameters in the profile to determine a current performance level of the port and performing a set of actions using the current performance level as a baseline. The set of actions include incrementally adjusting at least one of the parameters, determining another set of performance data in response to the adjusting, evaluating the performance data to determine a new performance level, and determining from the new performance level if a maximum performance level for the port is realized.

Exemplary embodiments further relate to a computer program product for providing network performance optimization. The computer program product includes instructions for causing a computer to implement a method. The method includes gathering a set of performance data for a port provisioned with a profile. The profile is defined by parameters with associated metrics that are used to establish a level of service for the port. The method also includes analyzing the set of performance data in light of the parameters in the profile to determine a current performance level of the port and performing a set of actions using the current performance level as a baseline. The set of actions include incrementally adjusting at least one of the parameters, determining another set of performance data in response to the adjusting, evaluating the performance data to determine a new performance level, and determining from the new performance level if a maximum performance level for the port is realized.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 6 is a table listing various trigger types and corresponding actions to be taken via performance optimization according to exemplary embodiments;

DETAILED DESCRIPTION OF EXEMPLARY EMBODIMENTS

Performance optimization of networks, such as a DSL network, is provided in accordance with exemplary embodiments. The performance optimization services optimize the data rate and error performance associated with ports for customer premise equipment (CPE), which are provided, e.g., via DSL networks. As used herein, the term "profile" refers generically to both line and profiles. Any changes in the "profile" refer to changes in the "line profile," "service profile," or both, in the context of DSL service optimization. According to exemplary embodiments, the performance optimization services provide data collection, evaluation criteria, and a transition matrix for profiles associated with customer premise equipment (CPE). The performance optimization services monitor ports serviced via, e.g., a DSL network and associates profiles with each port. The performance optimization services guide these ports through a sequence of measured steps across a large set of profiles. In exemplary embodiments, a set of maximum synchronization (max sync) profiles is included, as well as several sets of lower speed profiles. In addition, some profiles may modify other line parameters, such as interleaving and noise margin.

Ports may be moved into performance optimization testing at their current profile and are driven to move to higher speed profiles, as long as the performance is acceptable, as may be defined using various criteria described herein. In addition, threshold crossing alerts (TCAs) may be used to inform the performance optimization services of performance issues. When TCAs occur, the performance optimization services follow up with selective polling. After evaluating the performance, the performance optimization services can move ports to more restrictive/lower speed profiles in order to improve noise performance. In this manner, profiles may be changed on an ongoing basis, as a result of test triggers, data collection, and analysis. As a result, the performance optimization services migrate ports from their entry point profile to their optimal profile, which may or may not be max sync.

Figure 1:
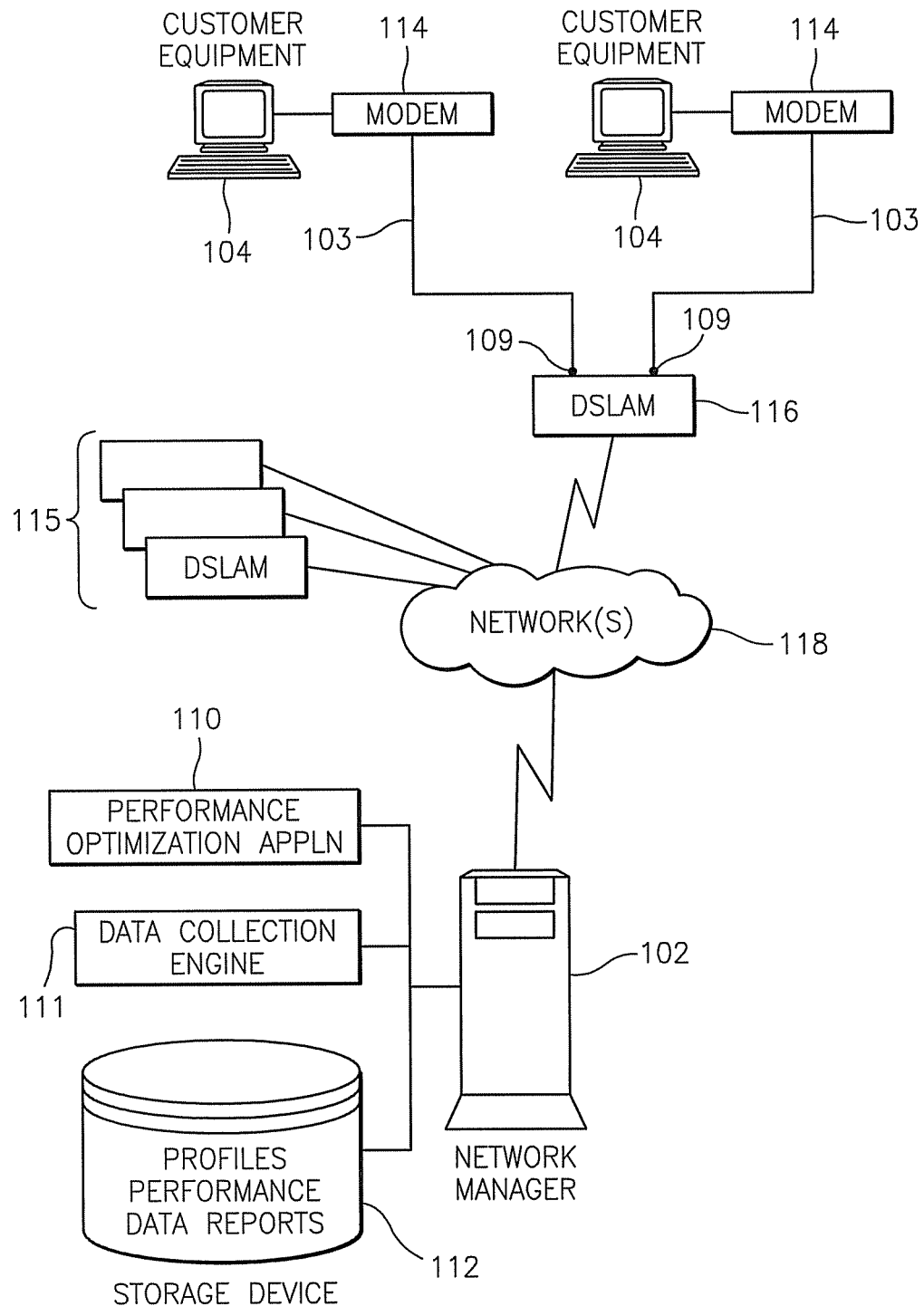
FIG. 1 is a block diagram of a system upon which performance optimization may be implemented according to exemplary embodiments.

Referring now to FIG. 1, a block diagram of an exemplary system for implementing the performance optimization services will now be described. The exemplary system of FIG. 1 includes a Digital Subscriber Line Access Multiplexer (DSLAM) 116 in communication with customer premise equipment (CPE) 104. The DSLAM 116 provides digital subscriber line (DSL) services to customers via the CPE 104. In exemplary embodiments, DSLAM 116 includes multiple ports 109, each of which may be assigned to, and connect with, a CPE 104 via respective customer lines (e.g., local loops 103).

According to an exemplary embodiment, a network manager 102 accesses the DSLAM 116, which receives resource requests from one or more of the CPE 104 via asymmetric digital subscriber line (ADSL) modems 114. Digital subscriber line communications are well known and will be appreciated by those skilled in the art. Communications between the ADSL modems 114 and the DSLAM 116 may utilize standard transmission protocols such as Asynchronous Transfer Mode (ATM). The DSLAM 116 provides service to a limited region via local loops 103 (e.g., copper lines). Other DSLAMs 115, service other geographic regions.

The DSLAM 116 may include a bank of ADSL modems on one side and an upstream fibre optic or high-speed copper data connection on the other side. The DSLAM 116 consolidates the ADSL user connections from CPE 104 onto the upstream connection for transmission to other networks.

Customer premise equipment 104 may comprise computing devices such as, but not limited to, a desktop, laptop, or other similar general-purpose computing device known in the art. As shown in the system diagram of FIG. 1, each of the CPE 104 is coupled to the ADSL modems 114. Each of the CPE 104 utilizes respective ADSL modems 114 to initiate connectivity to one or more networks(s) 118. Networks 118 may include any type of network including, but not limited to, a wide area network (WAN), a local area network (LAN), a global network (e.g. Internet), a virtual private network (VPN), and an intranet. The networks 118 may be implemented using a wireless network or any kind of physical network implementation known in the art. In addition, networks 118 may include a number of network elements (e.g., ATM/Ethernet switches, routers, and other nodes that facilitate customer communications and support network management functions).

According to an exemplary embodiment, the network manager 102 executes an application 110 for conducting the performance optimization activities described herein. The network manager 102 may comprise any suitable high-speed microprocessor capable of handling the volume of activities provided by the features and functions of the performance optimization application 110. In exemplary embodiments, the network manager 102 executes a data collection engine 111 for gathering performance data from the CPE 104. The type of performance data collected is described further herein. In alternative exemplary embodiments, the data collection activities may be conducted by the performance optimization application 110. The network manager 102 is in communication with a storage device 112 that stores a variety of information, such as profiles for its customers, DSL port inventory, performance data gathered by the data collection engine 111, test statuses, and various reports. A profile may be used to define the configuration of a DSL service by specifying parameters at which the service provider's DSL port and the customer modem 114 should operate. One or more of the CPE 104 may be associated with a profile. Reports that are generated via the performance optimization include, e.g., statistical information regarding performance data collected from CPE 104.

Figure 5:
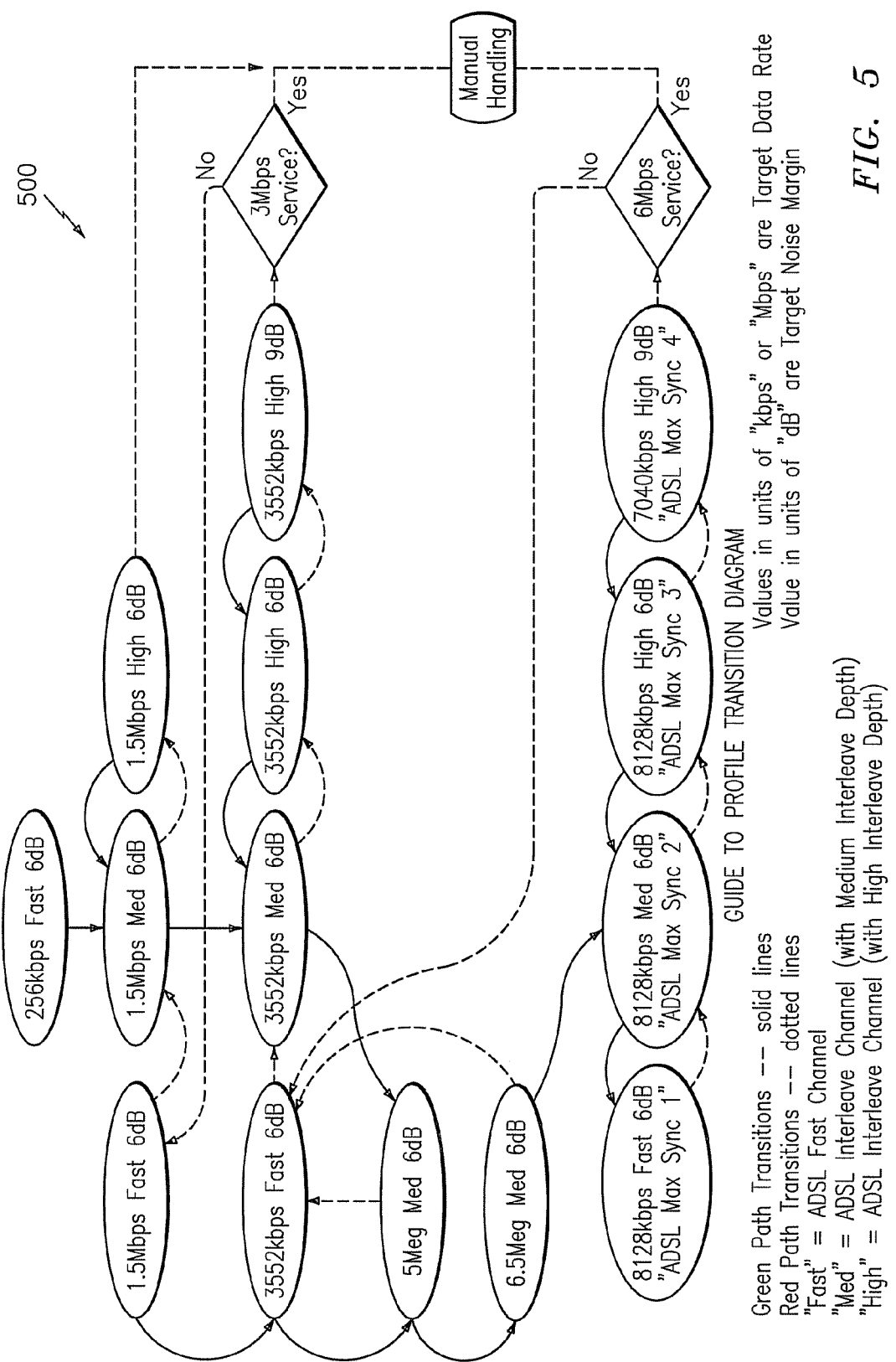
FIG. 5 is a flow diagram describing a bidirectional profile transition path used in implementing performance optimization, with respect to an asymmetric digital subscriber line (ADSL) network according to exemplary embodiments.

As indicated above, the performance optimization services provide a transition matrix for profiles associated with CPE 104 (FIG. 5). The performance optimization services guide ports (e.g., DSL ports) associated with CPE 104 through a sequence of measured steps across a large set of profiles. Ports may be moved into performance optimization testing at their current profile and are driven to move to higher-speed profiles, as long as the performance is good. Profiles may be changed on an ongoing basis, as a result of test triggers, data collection, and analysis. As a result, the performance optimization services migrate ports from their entry point profile to their optimal profile, which may or may not be max sync.

An exemplary process for implementing the performance optimization services will now be described with respect to the flow diagram of FIG. 2. At step 202, a port associated with a device, such as one of the CPE 104, is selected for testing via the performance optimization application 110. This selection may be initiated in response to various triggering events. A new or modified service may trigger testing (e.g., newly provisioned ports, ports with speed changes, ports with manual profile changes, port moves, etc.). Other events, such as an expired timer or a previously failed test may trigger the testing. In addition, or alternatively, a threshold crossing alert (TCA) may trigger testing. A TCA (see, e.g., TCA 402 in FIG. 4) may include any type of event or condition that indicates an actual or potential problem exists with a port (e.g., an alarm from the network 118 indicating performance of the service or related network component does not meet specification). In addition, or alternatively, a test may be initiated as a result of the service provider's business processes (e.g., a customer call to help desk, a compromise to network communication elements that service a CPE, etc.).

Figure 3:
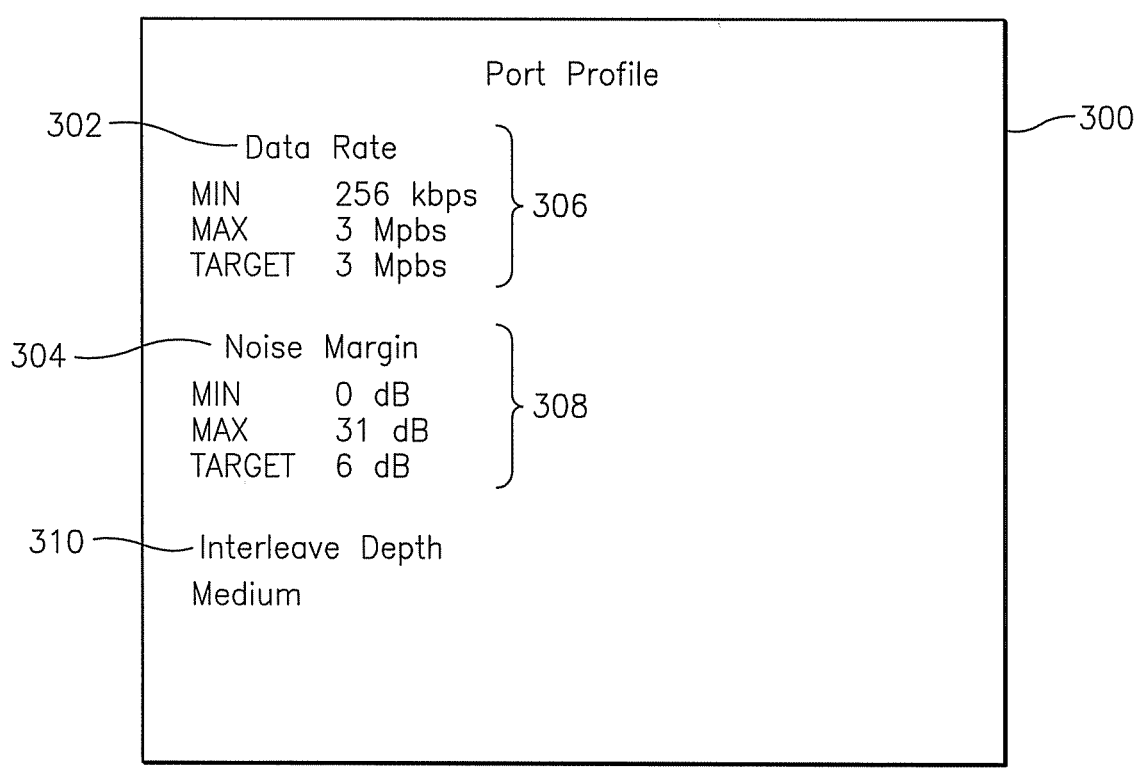
FIG. 3 depicts a profile record that is utilized in implementing performance optimization according to exemplary embodiments.

The profile, equipment details, and test state associated with the port for CPE 104 are retrieved from the storage device 112 at step 204. A sample profile record 300 is shown in FIG. 3. The profile record 300 of FIG. 3 specifies the parameters at which the DSL port and customer modem 114 should operate. As shown in FIG. 3, parameters include data rate 302, noise margin 304, and interleave depth 310. Thus, the port for the profile record 300 is configured to operate with a target data rate of 3 Mbps, a target noise margin of 6 dB, and a medium interleave depth. A port configured in this manner may support a customer who has subscribed to an available service with data rate connectivity up to 3 Mbps (i.e., MAX). A higher speed profile may be required to support a higher speed service. Once a port is operating according to the profile, the performance optimization application 110 collects certain performance metrics and evaluates them against user-specified thresholds as described herein. In exemplary embodiments, the data rate 302 and noise margin 304 are used to optimize the line performance associated with a given CPE 104 port 109.

In addition, profile record 300 lists three values 306 for the data rate 302: MIN, MAX, and TARGET. The MIN value represents a minimum acceptable data rate at which the DSL port and customer modem may operate, in this example, 256 kbps. The MAX value represents the maximum data rate, in this example 3 Mbps, and the TARGET value represents the target data rate for the profile, in this example 3 Mbps. Likewise, profile record 300 lists three values 308 for the noise margin: MIN, MAX, and TARGET. The MIN value represents a minimum acceptable noise margin at which the customer modem may operate, in this example 0 dB. The MAX value represents a maximum noise margin, in this example 31 dB, and the TARGET value represents the target noise margin for the profile, in this example 6 dB. These minimum, maximum, and target values reflect the parameters that may be adjusted to optimize performance of a port and may further depend upon the type of network service being monitored (e.g., ADSL, XDSL, etc.). It will be understood that other types of parameters may be used in optimizing port performance and that the parameters shown in profile record 300 are provided for illustrative purposes.

Figure 4:
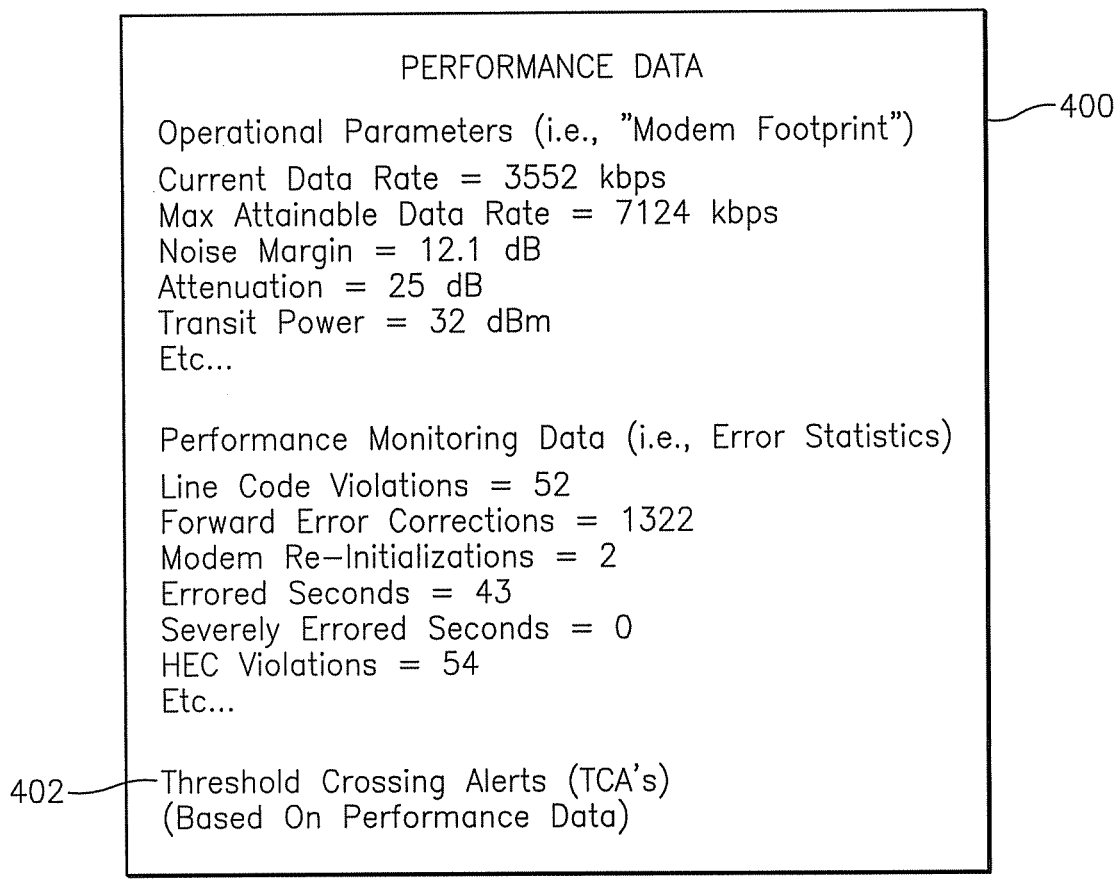
FIG. 4 depicts a record of performance data for a customer premise equipment port that is utilized in implementing performance optimization according to exemplary embodiments.

At step 206, modem connectivity/sync is determined and performance data is collected for the CPE 104 port via the data collection engine 111. As indicated above, the types of performance data collected may include, operational parameters (also referred to as "modem footprint"), e.g., current data rate, maximum attainable data rate, noise margin, attenuation, etc. Additionally, performance monitoring data (also referred to as "error statistics") may be collected (e.g., code violations (CVs), forward error correction (FECC), and modem re-initialization (Re-Init)), to name a few. Some, or all of these values may be used in the evaluation of the port's performance. Sample performance data 400 collected in step 206 is shown in FIG. 4. If the performance data cannot be collected for the port (e.g., no connection), a delay may be assigned at step 216 and testing may be re-initiated at a later time.

The criteria for acceptability of performance (as may be established by representatives of the service provider) may be input to the performance optimization application 110 in terms of user-configurable thresholds. Threshold values for each parameter may vary, depending on the port's current profile. At step 208, the performance optimization application 110 analyzes and evaluates the performance data collected in step 206 in light of the current profile, such as the profile record 300, and user-supplied performance thresholds to determine a current performance level of the CPE 104 port 109. At step 209, it is determined whether to adjust the configuration of the CPE 104 port 109. If no adjustments are necessary, an appropriate delay is assigned at step 216, and the port is tested again at a later time via step 218 and the process returns to step 202.

At step 210, if adjustments are desired, the performance optimization application 110 adjusts a parameter value listed in the profile record 300 based upon the current performance level determined in step 208. The adjustment may vary based upon the particular results of the evaluating. For example, if the current performance level is acceptable, the data rate may be increased based upon the next highest profile (e.g., from 1.5 Mbps to 3 Mbps). If the current performance is not acceptable, the profile may be transitioned to one employing interleaving whereby greater noise immunity is provided. In some cases, the data rate may be decreased to the next lower profile if further evaluations indicate unacceptable performance. Adjustments to the parameters may be accomplished by applying a new profile to the port. These features are described in further detail in FIG. 5.

In addition, the particular adjustments selected by the performance optimization application 110 may depend upon the type of services being tested. For example, as shown in FIG. 5, an exemplary flow diagram illustrates a number of adjustments that may be implemented for an ADSL network service. This diagram lists the available profiles and the allowed transition profiles. It will be understood that the flow diagram illustrated in FIG. 5 may be varied for other types of network services, e.g., XDSL transport.

At step 212, the data collection engine 111 gathers additional performance data from the CPE 104, which is now operating under the configuration parameters associated with the new profile resulting from the adjustments made in step 210. The actual change may be transparent to the customer operating the CPE. The performance optimization application 110 evaluates this additional performance data in a manner similar to that described above in step 208 to determine the current performance level of the CPE; that is, how the CPE is operating under the new profile parameters. If performance is not acceptable at step 214, the port may be reverted to the previous profile (step 210). If operation (performance) is successful at the new profile at step 214, an appropriate delay is assigned at step 216, and the port waits at step 218 for the next test trigger. Steps 202 through 218 may be repeated multiple times depending on a number of factors. For example, if the original profile for the CPE 104 port 109 is set for the highest data rate available from the service provider and is determined to be performing well at this speed (e.g., at an acceptable data rate and error performance), there will be fewer adjustments that can be made to test the customer's service. The loop may be repeated so long as there are available adjustments that can be made. The flow diagram in FIG. 5 illustrates these adjustments and responses thereto.

Ports 109 for other CPE 104 may be tested and evaluated by the performance optimization application 110, according to these same steps. Testing of other ports may be performed in sequence or in parallel.

Turning now to FIG. 5, a flow diagram describing a bi-directional profile transition path 500 used in implementing the performance optimization services with respect to an asymmetric digital subscriber line (ADSL) network will now be described in exemplary embodiments. The performance optimization services implement profile transition flows that include a range of profiles. The profile transition flows are described herein with respect to a green path (represented as solid lines in FIG. 5) and a red path (represented as dotted lines in FIG. 5). In addition, the performance optimization services provide for delay parameters that define the time frame for moving ports on these paths or to/from a converged state. A "converged" state is achieved when the port is determined to be operating at its optimal performance level (e.g., highest data rate with acceptable error performance).

These delay parameters may be defined by a fast track, slow track, dormant track, red assessment track, and initial track, each with uniquely defined assessment periods (e.g., fast track: one day or less; slow track: 2-4 days prior to progressing a profile in a red or green path; dormant track: randomized timer interval, etc.). Test evaluations for profiles may be conducted as part of the red or green path movement of DSLAM ports and may be conducted by examining various criteria over a time period specified by the fast track or slow track. In exemplary embodiments, the test evaluation fails if any of the criteria is not met, or a TCA is received during evaluation and subsequent examination of criteria indicates the evaluation will fail.

The performance optimization application 110 may test ports as triggered by the events described in step 202 (e.g., newly provisioned ports, ports with speed changes, ports with manual profile changes, and port moves to a new network element, such as one of DSLAMs 115). A port may be considered 'converged' when any of the following occur: the port migrates up to MaxSync1 profile via fast track testing of the performance optimization services; the port enters the testing with a profile of MaxSync1; a manual profile change configures the port with MaxSync1; the port reaches a profile that has higher data rate than the subscribed service data rate and fails a green evaluation test (e.g., the port can not progress on green path) and passes the red evaluation test that immediately follows the failed green evaluation (i.e., the port is not demoted on red path); the port moves (via a red transition) to new profile that has higher data rate than the subscribed service data rate; the port undergoes a red assessment and passes the final red evaluation at the end of the red assessment track; and the port goes through a green evaluation, passes the evaluation but is unable to sustain the data rate credentials for the higher rate profile and hence, is moved back to the old profile (with converged state).

As described herein, the terms 'pass' and 'fail' are used throughout this description in reference to performance optimization red evaluations and green evaluations. A green evaluation is passed when the port is performing well enough to be transitioned to the next profile in the green direction (e.g., a higher speed, less restrictive profile) and a profile change is requested. As indicated above, the determination for what is considered a 'passing evaluation' and 'failed evaluation' may be established by representatives of the service provider implementing the performance optimization services. A green evaluation has failed when the port is not performing well enough to be advanced in the green direction. In this instance, the port will stay at its current profile, and a red evaluation will commence. A red evaluation has passed when the port is performing well enough that it does not need to be transitioned in the red direction. The port will stay at its current profile. A red evaluation has failed when the port is not performing well enough to stay at its current profile and must be transitioned to the next profile in the red direction (e.g., a lower speed, more restrictive profile). A profile change is requested. Following the profile change, a red assessment will begin to ensure the port is performing well enough at the new profile. In exemplary embodiments, the red and green evaluations are each defined by independent sets of performance thresholds.

The bidirectional transition profile transition path shown in FIG. 5 may be entered at a location corresponding to the current profile. Testing for the port begins at this profile. Profile transitions may move in a direction illustrated by the arrows in the flow diagram of FIG. 5. Transitions for the green path (i.e., solid line) indicate profile changes in a positive direction (i.e., a less restrictive and higher data rate). Profile transitions along the green path are governed by the green path state machine as described herein.

Likewise, transitions in the red path (i.e., dotted line) indicate profile changes in a negative direction (e.g., more restrictive, lower data rate). Profile transitions along the red path are governed by the red path state machine. As shown in FIG. 5, the flow provides no more than two paths out of each profile (one red, one green). The profile transition flow does not allow a port to move to a profile that has a nominal data rate below the customer's subscribed service data rate. If all profile options have been exhausted and port performance is still not acceptable, the port may be removed from performance optimization testing whereby manual handling by the service provider is initiated. This scenario may occur when the profile cannot be dropped to a data rate lower than that needed to support the customer's subscribed service.

As indicated above, in addition to collecting data rates as the metric used in evaluating performance (and moving ports among profiles), other types of data may be collected and used as well. For example, LCV, re-initializations, FECC, errored seconds (ES), severely errored seconds (SES), header error control (HEC) violations, line attenuation, and other upstream parameters may be collected.

As further indicated above, various trigger conditions may be used to initiate an evaluation. For example, in a green path, an elapsed time may trigger an evaluation. These evaluation triggers are illustrated further in table 600 of FIG. 6. Evaluation criteria and use may be configured as dictated by the interests of the service provider. For example, evaluations may be multi-interval, with peg counts used for red evaluations to determine whether to transition to a new profile. LCV, Re-Init, and FECC counts may be evaluated against a 'per profile' threshold (e.g., stair step approach), which accounts for differences in data rate. Individualized LCV, Re-Init and FECC counts may be used as success or failure evaluation criteria per each profile.

Further, if a TCA is received while waiting for the next green evaluation, the green assessment of the port may be considered to have failed. The port may then be transitioned to red state machine, and the red assessment is conducted at the same profile. If the red assessment passes, the port will converge and be placed on dormant test track. If red assessment fails, the port is transitioned to a lower profile per red state machine path.

For most all of the profiles in the transition diagram, there is more than one exit path (a red one and a green one). It will be noted that an evaluation does not choose between the "green" path and the "red" path. Rather, based on a green path trigger, the green evaluation determines whether to take the green exit path or stay at the current profile. Based on a red path trigger (e.g., TCA), the red evaluation determines whether to take the red exit path or stay at the current profile. In this manner, the red transitions and the green transitions run independently of each other.

While the rules adopted for implementing the green path and red path state machines are independent of one another, the ports may be transitioned between the two state machines (green path or red path), based on failure of a test evaluation. If a port on the green path fails the green evaluation, the port may then be transitioned from the green path state machine to the red path state machine, and a red path evaluation is then conducted at the same profile. The red path state machine may govern the port until it is converged or fails out of the evaluation for subsequent manual handling.

As shown in FIG. 5, a port beginning at 256 kbps may be moved to the 1.5 Mbps medium interleave profile. The evaluation thresholds for the 256 kbps profile may be tuned to ensure a smooth transition to the 1.5 Mbps profile based upon collected performance data. The performance optimization services may be configured such that ports will not be permanently placed at the 5 Mbps or 6.5 Mbps profiles, but rather, these are transitional steps toward the max sync profiles (e.g., either the profile is moved up to 8128 Kbps and then stabilized, or is moved down to 3552 Kbps profile and stabilized).

A performance optimization state machine may include two characteristics: Fast/Slow track operation and Green/Red path direction of movement and operation according to various "tracks." Red path and green path state machines govern whether the DSL port under evaluation will be moved to a more restrictive profile (red direction) or a less restrictive profile (green direction). In exemplary embodiments, the red/green tracks are applied independently as separate state machines with separate evaluation criteria. Failure of a green evaluation test will trigger movement from the green state machine to the red state machine. Failure of a red state machine evaluation test will trigger movement to a more restrictive profile until the port converges.

In exemplary embodiments, "tracks" govern the overall flow of events in the performance optimization algorithm, including the delays that are imposed between certain events. Fast and slow tracks may be used in green path state machine and govern the amount of elapsed time duration that DSL ports will be assessed to be considered acceptably stable for movement to the next profile on the green path. The dormant track governs the "Backoff" period, an extended interval of time, during which a converged port waits until the next green path evaluation. Hence, expiration of the BackOff interval is a test trigger, as shown in FIG. 2. In an exemplary embodiment, the dormant track will not execute tests for ports converged on MaxSync1 or MaxSync2 profiles. The red assessment track governs the timeframes for red path evaluation.

For the fast track, an assessment period may be conducted in a timeframe of less than a day, measured in hours. A slow track assessment period may be conducted in timeframes spanning multiple days.

The dormant track provides a time frame for retest of ports not converged on MaxSync1 or MaxSync2 profiles. This timer may be in units of days and may be applied as number of days to wait after achieving a converged state before testing. The red assessment track may allow for a subsequent evaluation of performance data after initial evaluation of a red assessment. If the initial evaluation (e.g., Red Test 1) passes, then a Red_Wait_Delay indicator is applied to the port via the BCS application 110 and another test (e.g., Red Test 2) is executed.

The initial track may impose a delay prior to green path testing of "Low" priority ports (e.g., these ports result from a new order for DSL service). The delay allows the customer to connect the DSL modem 114 and begin using the new service before testing begins. This delay may be user-settable in units of hours. Following this delay, the port is moved to green path/fast track testing with medium priority.

As indicated above, various trigger criteria may be used as entrance criteria for the green and red path state machines. In addition, a test priority may be assigned to determine if immediate or deferred testing is desired. The test priority may also set the precedence for which ports should be tested. Priorities may be established (e.g., high priority—immediate testing required and should be prioritized over other ports queued for testing; medium priority—ports are scheduled for immediate testing but are queued behind any high priority ports; low priority—testing will be deferred a fix period of time, upon expiration of which, the ports are queued for testing with medium priority ports.

Figure 2:
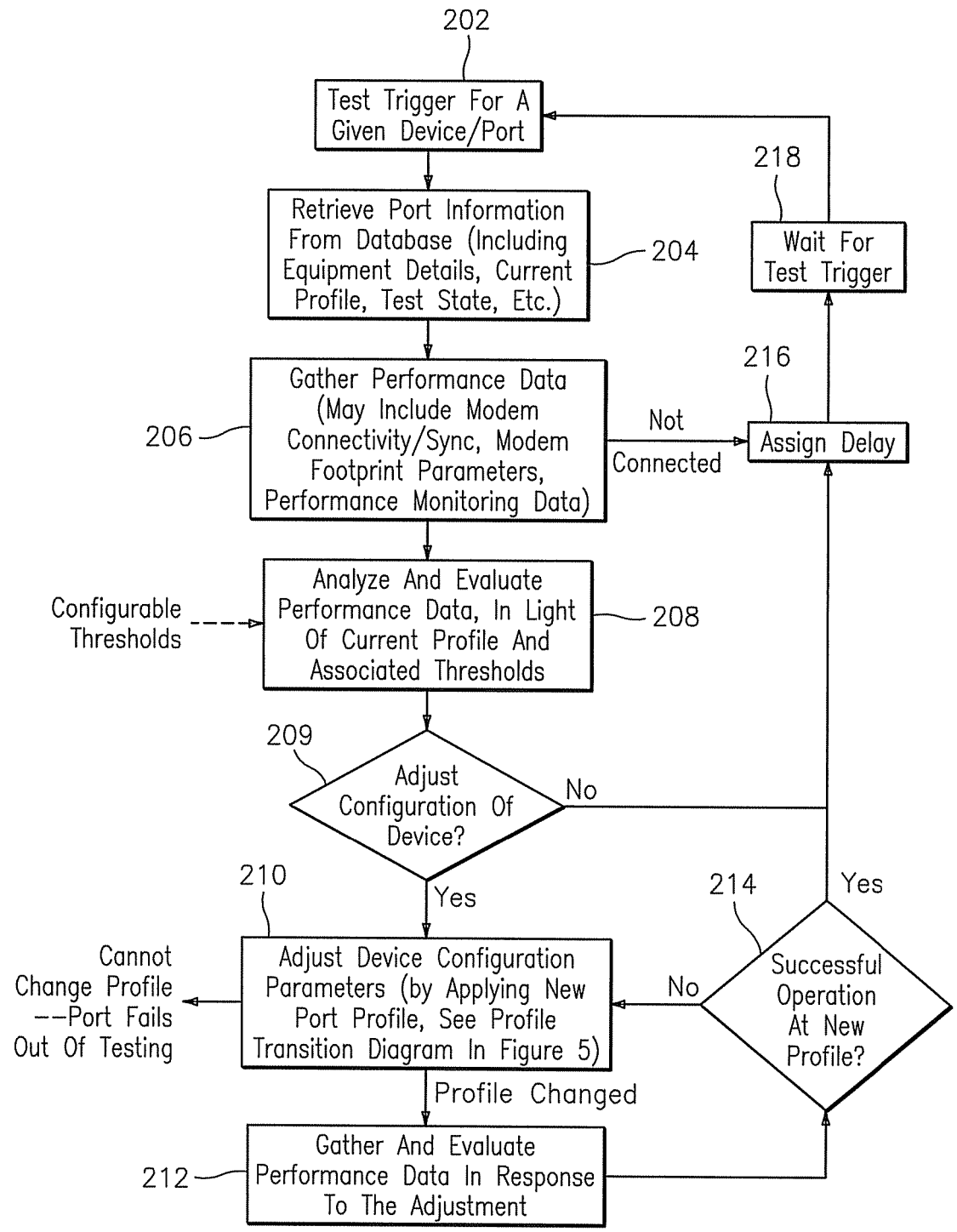
FIG. 2 is a flow diagram describing a process for implementing performance optimization according to exemplary embodiments.

Ports for which connectivity and/or modem sync are not present, based on the testing described in FIGS. 2 and 5, may be marked with a status of "NOT_CONNECTED." If the port is "NOT_CONNECTED" for high or medium priority designations, a retry of test initiation may be attempted. After completion of a specified number of retries, the port may be placed in the NOT_CONNECTED state and put on the dormant track.

Figure 7:
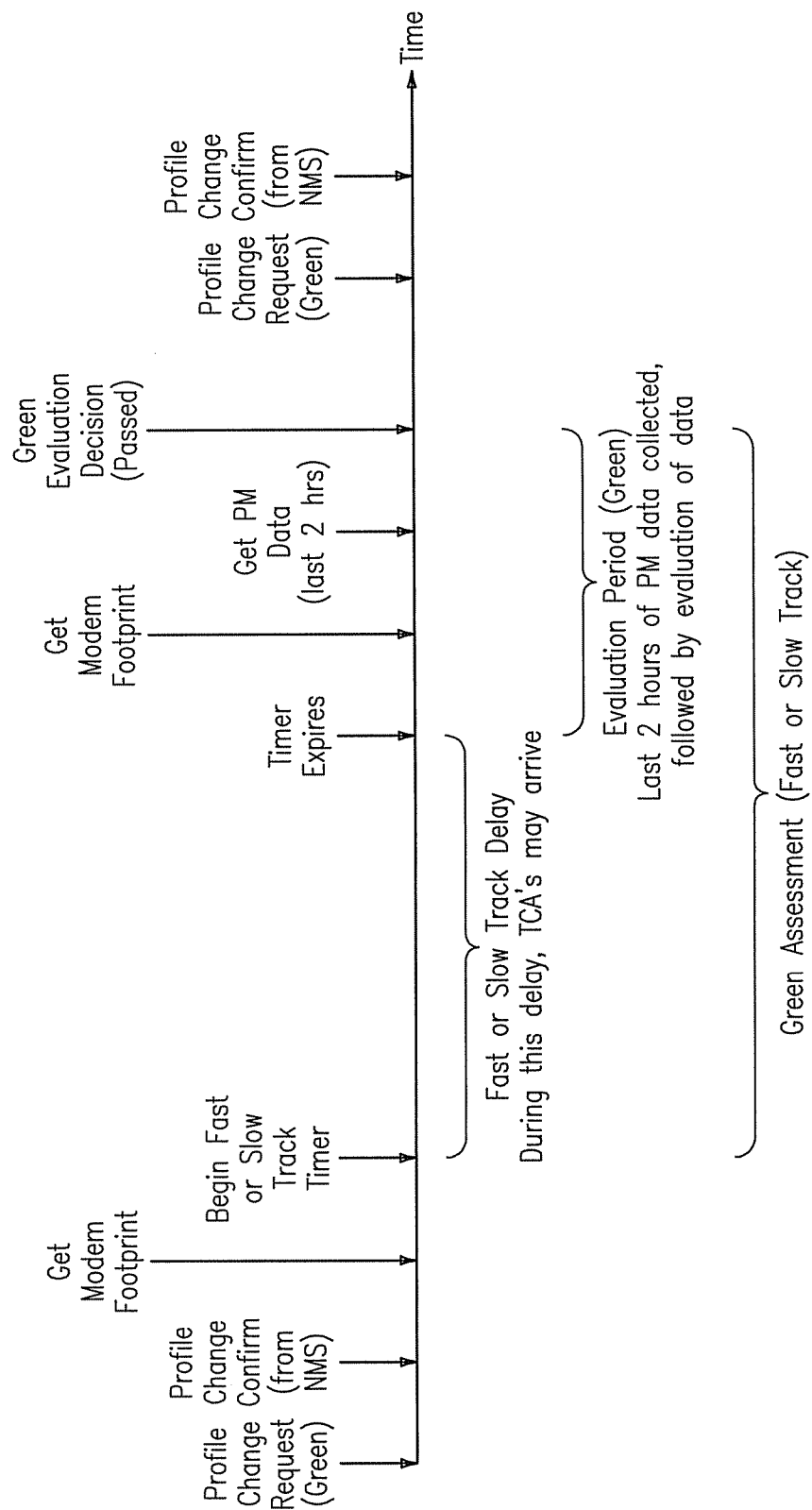
FIG. 7 is a timeline illustrating a sample sequence of events in a "green" path assessment performed via performance optimization according to exemplary embodiments.
Figure 8:
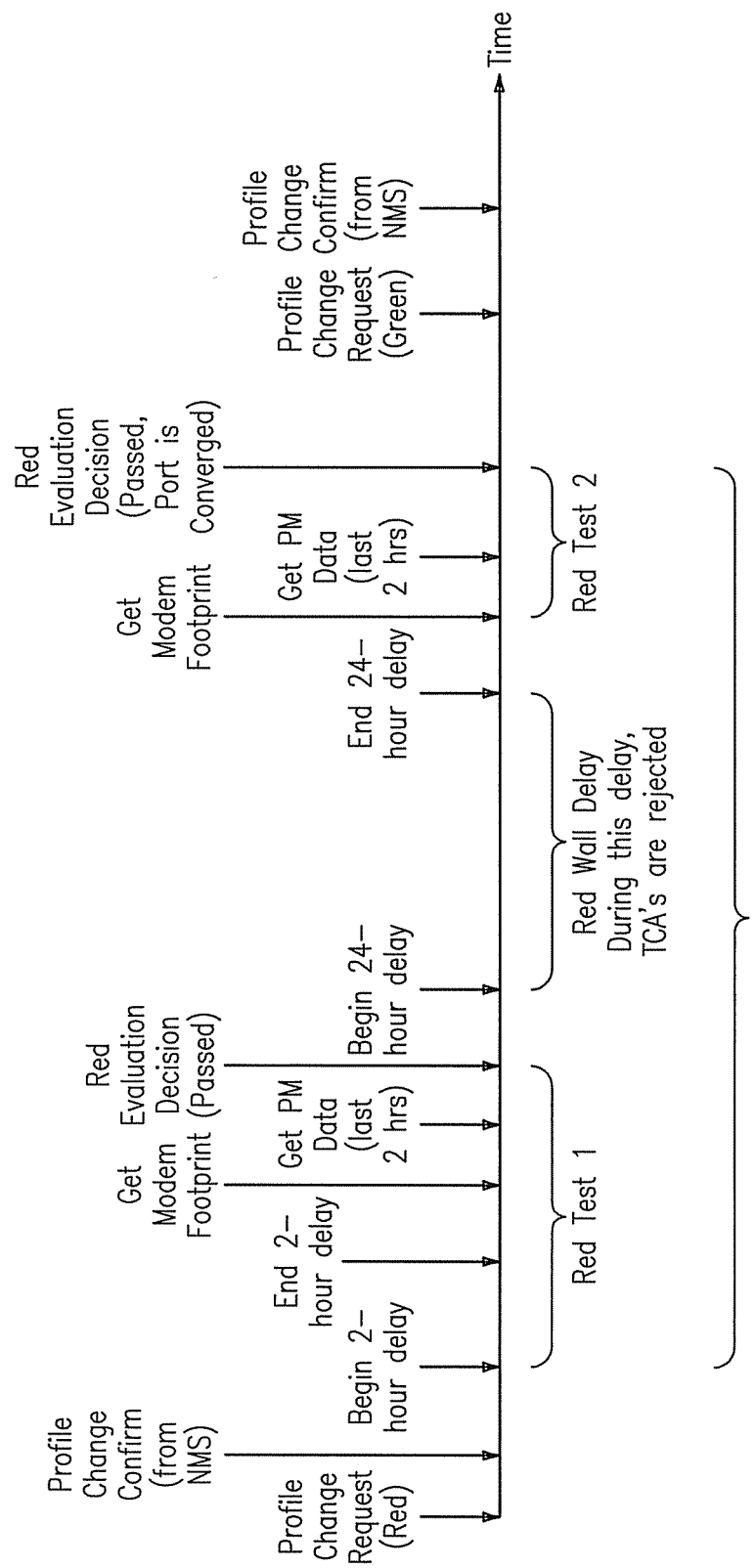
FIG. 8 is a timeline illustrating a sample sequence of events in a "red" path assessment performed via performance optimization according to exemplary embodiments.

Turning now to FIG. 7, a timeline of events for a green assessment will now be described. As shown in the timeline of FIG. 7, a green profile transition has occurred, and the fast/slow track events are repeated: a delay, followed by another green evaluation. A timeline of events for a red assessment is shown in FIG. 8. As shown in the timeline of FIG. 8, a red profile transition has occurred, and the red test track events begin: red test 1 (delay, data collection, red evaluation), a Red_Wait Delay (e.g., approximately 24 hours), and Red Test 2 (data collection, red evaluation). If the port passes Red Test 2, the port is converged, and the track is changed to dormant.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method, comprising:
providing a bi-directional transition path for profiles having varying levels of service parameters and rules for traversing the bi-directional transition path during evaluation of a port;
gathering a set of performance data for the port provisioned with one of the profiles, the profile defined by parameters with associated metrics used to establish a level of service for the port;
analyzing the set of performance data in light of the parameters in the profile, and determining a current performance level of the port from results of the analyzing;
iteratively performing a set of actions using the current performance level as a baseline until a maximum performance level for the port is realized, the set of actions comprising:
incrementally adjusting one of the parameters, the adjusting including increasing a data rate in the profile when the current performance level exceeds a defined threshold level;
determining another set of performance data in response to the adjusting; and
evaluating the other set of performance data to determine a new performance level; and
using results of the evaluating to determine a direction in the bi-directional transition path, and traversing the bi-directional transition path in the direction by evaluating the port using another of the profiles in the bi-directional transition path.

2. The method of claim 1, wherein the adjusting one of the parameters further includes increasing noise immunity via imposing an increased noise margin when the current performance level is below a defined threshold level.

3. The method of claim 1, further comprising:
maintaining the parameters resulting from the adjusting where the maximum performance level of the port is realized if the parameters resulting from the adjusting coincide with the profile provisioned for the port; and
returning the parameters to those which coincide with the maximum performance level defined for the profile provisioned for the port if the parameters resulting from the adjusting do not coincide with the profile provisioned for the port.

4. The method of claim 1, wherein the metrics include the data rate, the maximum attainable data rate, code violations, forward error corrections, and modem re-initializations.

5. The method of claim 4, wherein the adjusting one of the parameters further includes:
increasing noise immunity via imposing an increased noise margin when the current performance level is below a defined threshold level.

6. The method of claim 4, wherein the adjusting one of the parameters further includes decreasing the data rate in the profile when the current performance level is below a defined threshold level.

7. The method of claim 1, wherein the gathering performance data is initiated in response to a triggering event, the triggering event including an elapsed time between completed evaluations for the profile.

8. A system, comprising:
a computer processor; and
an application executing on the processor, the application implementing a method, comprising:
providing a bi-directional transition path for profiles having varying levels of service parameters and rules for traversing the bi-directional transition path during evaluation of a port;
gathering a set of performance data for the port provisioned with one of the profiles, the profile defined by parameters with associated metrics used to establish a level of service for the port;
analyzing the set of performance data in light of the parameters in the profile, and determining a current performance level of the port from results of the analyzing;
iteratively performing a set of actions using the current performance level as a baseline until a maximum performance level for the port is realized, the set of actions comprising:
incrementally adjusting one of the parameters the adjusting including increasing a data rate in the profile when the current performance level exceeds a defined threshold level;
determining another set of performance data in response to the adjusting; and
evaluating the other set of performance data to determine a new performance level; and
using results of the evaluating to determine a direction in the bi-directional transition path, and traversing the bi-directional transition path in the direction by evaluating the port using another of the profiles in the bi-directional transition path.

9. The system of claim 8, wherein the adjusting one of the parameters further includes increasing noise immunity via imposing an increased noise margin when the current performance level is below a defined threshold level.

10. The system of claim 8, wherein the application further performs:
maintaining the parameters resulting from the adjusting where the maximum performance level of the port is realized if the parameters resulting from the adjusting coincide with the profile provisioned for the port; and
returning the parameters to those which coincide with the maximum performance level defined for the profile provisioned for the port if the parameters resulting from the adjusting do not coincide with the profile provisioned for the port.

11. The system of claim 8, wherein the metrics include the data rate, the maximum attainable data rate, code violations, forward error corrections, and modem re-initializations.

12. The system of claim 11, wherein the adjusting one of the parameters further includes:
increasing noise immunity via imposing an increased noise margin when the current performance level is below a defined threshold level.

13. The system of claim 11, wherein the adjusting one of the parameters further includes decreasing the data rate in the profile when the current performance level is below a defined threshold level.

14. The system of claim 8, wherein the gathering performance data is initiated in response to a triggering event, the triggering event including an elapsed time between completed evaluations for the profile.

15. A computer program product comprising a non-transitory storage medium including instructions embodied thereon for causing a computer to implement a method, comprising:

providing a bi-directional transition path for profiles having varying levels of service parameters and rules for traversing the bi-directional transition path during evaluation of a port;
gathering a set of performance data for the port provisioned with one of the profiles, the profile defined by parameters with associated metrics used to establish a level of service for the port;
analyzing the set of performance data in light of the parameters in the profile, and determining a current performance level of the port from results of the analyzing;
iteratively performing a set of actions using the current performance level as a baseline until a maximum performance level for the port is realized, the set of actions comprising:
    incrementally adjusting one of the parameters, the adjusting including increasing a data rate in the profile when the current performance level exceeds a defined threshold level;
    determining another set of performance data in response to the adjusting; and
    evaluating the other set of performance data to determine a new performance level; and
using results of the evaluating to determine a direction in the bi-directional transition path, and traversing the bi-directional transition path in the direction by evaluating the port using another of the profiles in the bi-directional transition path.

16. The computer program product of claim 15, wherein the adjusting one of the parameters further includes increasing noise immunity via imposing an increased noise margin when the current performance level is below a defined threshold level.

17. The computer program product of claim 15, further comprising instructions for implementing:
    maintaining the parameters resulting from the adjusting where the maximum performance level of the port is realized if the parameters resulting from the adjusting coincide with the profile provisioned for the port; and
    returning the parameters to those which coincide with the maximum performance level defined for the profile provisioned for the port if the parameters resulting from the adjusting do not coincide with the profile provisioned for the port.

18. The computer program product of claim 15, wherein the metrics include the data rate and the maximum attainable data rate, code violations, forward error corrections, and modem re-initializations.

19. The computer program product of claim 18, wherein the adjusting one of the parameters further includes:
    increasing noise immunity via imposing an increased noise margin when the current performance level is below a defined threshold level.

20. The computer program product of claim 18, wherein the adjusting one of the parameters further includes decreasing the data rate in the profile when the current performance level is below a defined threshold level.

* * * * *